United States Patent [19]

Mock

[11] Patent Number: 4,724,119

[45] Date of Patent: Feb. 9, 1988

[54] TELEPHONE ANSWERING MACHINE WITH AN ERASABLE MESSAGE RECORDED ON THE INCOMING MESSAGE TAPE BY THE MANUFACTURER

[75] Inventor: Gerald L. Mock, Corona, Calif.

[73] Assignee: Fortel Corporation, Compton, Calif.

[21] Appl. No.: 867,498

[22] Filed: May 28, 1986

[51] Int. Cl.$^4$ ............................................. H04M 1/65
[52] U.S. Cl. ........................................ 379/79; 379/70
[58] Field of Search ................ 379/70, 74, 77, 80; 360/72.2; 381/110

[56] References Cited

U.S. PATENT DOCUMENTS

| | | | |
|---|---|---|---|
| 3,146,310 | 8/1964 | Jeffries et al. | 379/74 |
| 4,469,919 | 9/1984 | Nakamura et al. | 379/77 |

Primary Examiner—Raymond F. Cardillo
Assistant Examiner—James E. Tomassini
Attorney, Agent, or Firm—Keith D. Beecher

[57] ABSTRACT

A telephone answering machine which upon initial power-up plays back a message recorded by the manufacturer on the incoming message tape. This message may be in the form of advertising, operational instructions, or the like. Subsequent use of the machine causes the initial message to be erased. The message is recorded at the beginning of the incoming message tape together with a pre-defined tone. Upon initial power-up, the incoming message tape is rewound to its home position by the microcomputer of the telephone answering machine and, if the tone is detected, the machine automatically plays back the recorded message. At the end of the playback, the incoming message tape is returned to its home position and the telephone answering machine is set by the microcomputer to its auto answer mode, ready to respond to the first telephone call. The first telephone call to be received and recorded on the incoming message tape causes the initial message and the tone to be erased, so that thereafter the machine operates in a conventional manner. However, the user can repeat the initial message prior to the receipt of the first telephone call by pressing the message recover button of the machine.

4 Claims, 5 Drawing Figures

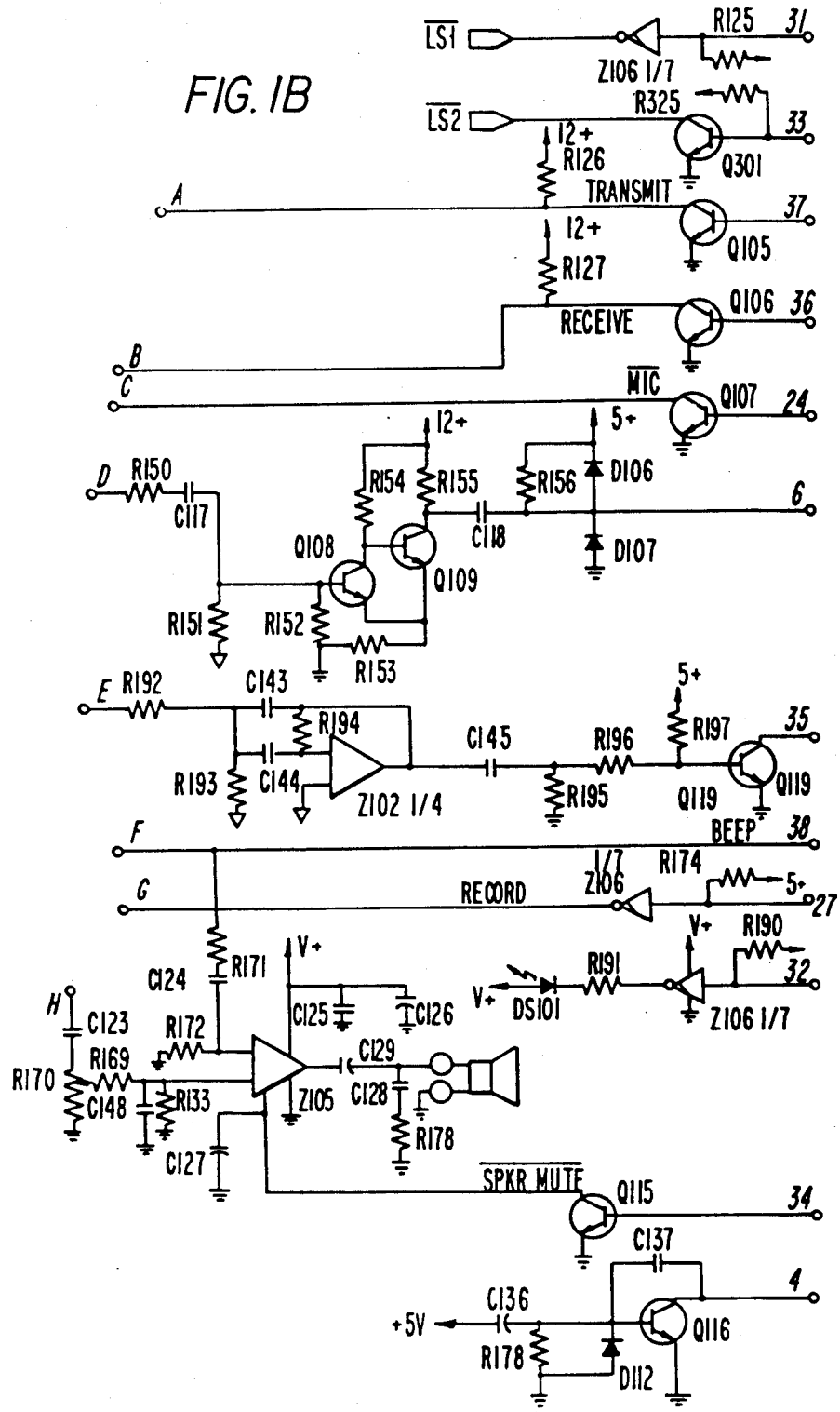
FIG. IB

TELEPHONE ANSWERING MACHINE WITH AN ERASABLE MESSAGE RECORDED ON THE INCOMING MESSAGE TAPE BY THE MANUFACTURER

BACKGROUND OF THE INVENTION

The system of the invention may be incorporated into telephone answering machines of the type including a first magnetic tape mechanism in which an announcement is recorded on a magnetic tape, and which is activated during an announcement interval in response to ring signals received over the telephone line. This causes the recorded announcement to be transmitted over the telephone line to the calling party during that interval. The telephone answering machine also includes a second magnetic tape mechanism in which incoming messages received over the telephoneline are recorded in sequence on a second magnetic tape.

The system of the invention may also be incorporated into a telephone answering machine in which the outgoing message and incoming messages are recorded on a single tape in a single magnetic tape mechanism; or one in which the outgoing message is stored in a solid state memory; or in other types of telephone answering machines.

Most present-day telephone answering machiens are controlled by a microcomputer, and when such a telephone answering machine is first energized, the microcomputer goes through a reset routine during which it checks both the outgoing announcement tape mechanism and the incoming message tape mechanism, and sets both tape mechanisms to their home positions. The microcomputer then acts to set the machine to its "auto answer" mode ready to respond to the first telephone call.

In the machine of the present invention, when the microcomputer detects the pre-defined tone as it goes through the reset routine it then automatically controls the incoming message tape mechanism so that the initial message recorded on the incoming message tape is automatically played back. After playback of the initial message, the microcomputer then returns the incoming message tape to its home position and sets the machine to its auto answer mode. As stated above, the initial message and the pre-defined tone are both erased when the machine responds to the first telephone call and records the first telephone message on the incoming message tape.

BRIEF DESCRIPTION OF THE DRAWINGS

FIGS. 1A, 1B and 1C together constitute a circuit diagram of a telephone answering machine which incorporates the system of the invention.

DETAILED DESCRIPTION OF THE ILLUSTRATED EMBODIMENT

Only those portions of the circuits of FIGS. 1A 1B, 1C and FIGS. 2A and 2B which are necessary for the complete and full understanding of the system of the present invention will be described herein.

Figure 1A:
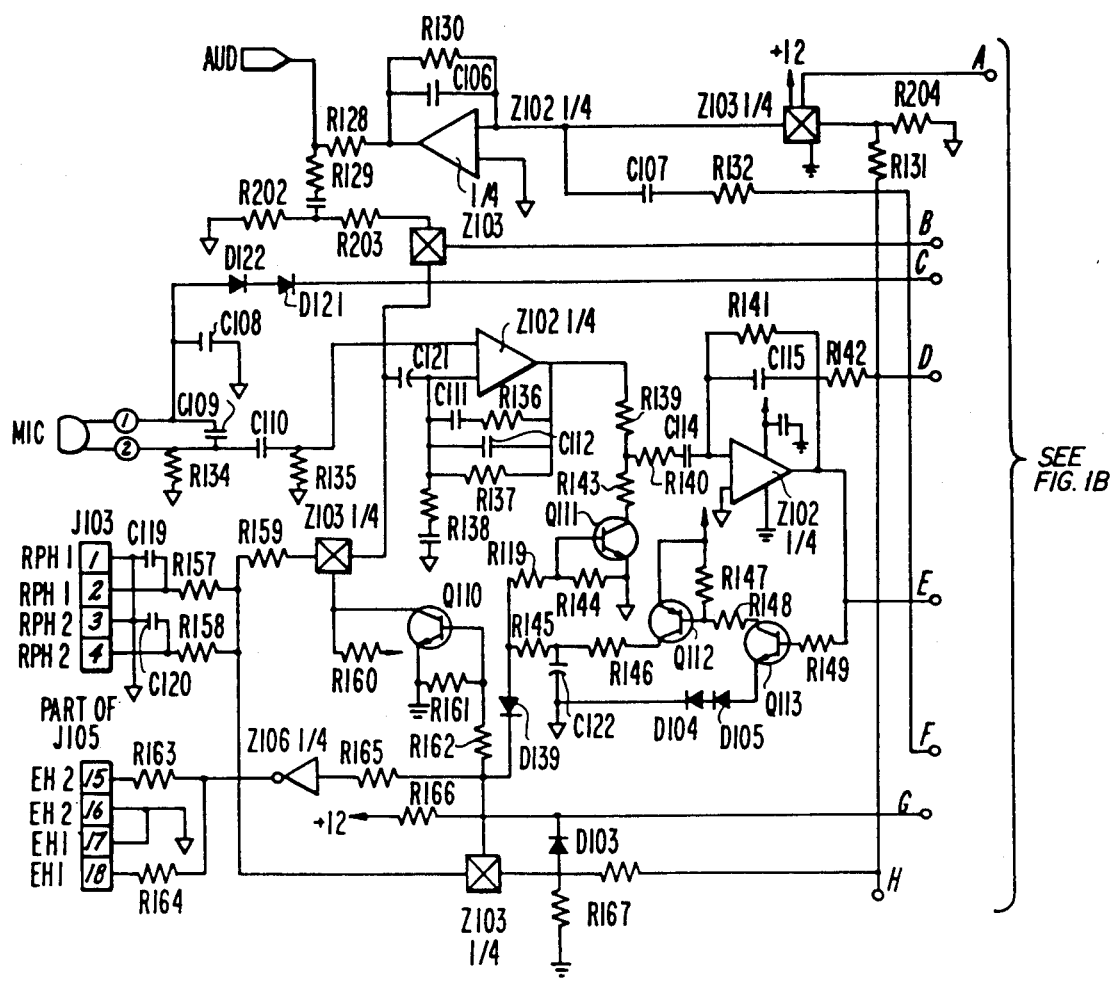
Figure 1C:
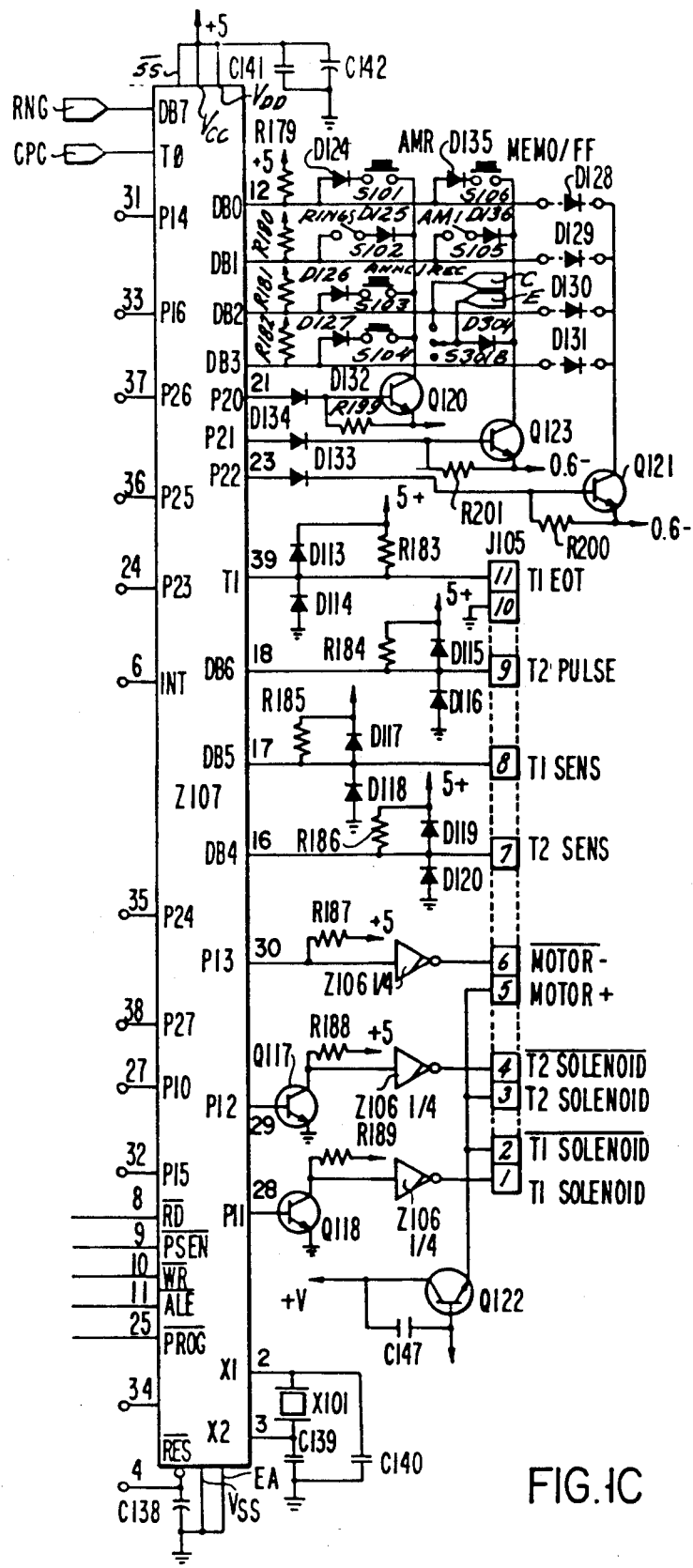

The circuit of FIGS. 1A, 1B and 1C includes a microcomputer Z107 (FIG. 1C) which may be of the type designated 8050. When power is applied to the telephone answering machine, a 5-volt voltage is introduced to a differentiator circuit C136 and R178 to deliver a pulse of approximately 100 milliseconds tot he base of transistor Q116. The differentiator circuit is made up of a 10 microfarad capacitor C136 and a 10 kilo-ohm resistor R178. This pulse will render transistor Q116 conductive for that time period, holding the RESET pin 4 of a microcomputer Z107 low, setting up the reset operation.

When reset is released, the microcomputer will undergo an initial routine operation, during which it causes the announcement tap (T1) to assume its home position. Then, the microcomputer will set the incoming message tape (T2) to its rewind mode. After the incoming message tape has been rewound to its home position, the predefined tone at the beginning of the tape is read, and the microcomputer causes the incoming message tape to move forward and play back the initial message which, together with the pre-defined tone, was recorded on the incoming message tape by the manufacturer.

After the initial message has been read back, the microcomputer will return the incoming message tape to its home position and set the telephone answering machine to its auto answer mode in readiness to answer the first telephone call. As mentioned above, when the first telephone message is recorded on the incoming message tape, the initial message and the tone are erased. Thereafter, the telephone answering machine operates in a normal manner.

The microcomputer Z107 controls the magnetic tape mechanism by way of a connector J105 (FIG. 1C). When pin 30 of the microcomputer goes high, the drive motor for both the outgoing message and the incoming messages magnetic tape mechanisms is activated. When pin 29 goes high, the T2 solenoid is energized to activate the incoming message magnetic tape mechanism. When pin 28 goes high, the outgoing message tape mechanism solenoid is activated.

Pulses from the incoming message tape mechanism are applied to pin 18. The pulses originate from a reed switch on the mechanism which senses motion thereof, with the reed switch providing four pulses per revolution of the incoming message tape mechanism. The T1 sense signal applied to pin 8 of connector J105 is fed to pin 17 of the microcomputer, and indicates to the microcomputer that the T1 head is engaged. Likewise, the T2 sense signal applied to pin 7 of the connector informs the microcomputer that the incoming message tape head is engaged.

A keyboard matrix is connected to pin 12-15 of the microcomputer Z107, the various columns of the matrix being selected through transistors Q120, Q123 and Q121, from pins 21, 22 and 23 of the microcomputer. The microcomputer scans the keyboard at regular intervals to determine the state of the various switches. The AMR push button switch of the keyboard permits the user to play back all of the messages accumulated on the incoming message tape, merely by pressing the switch and releasing it. Before the first telephone message has been received and recorded by the machine, the initial message may be replayed as many times as desired by pressing the AMR push button.

Ring signals received over the telephone line appear across the tip and ring signals 3 and 4 of connector J106, and are applied to operational amplifier Z101 through 22 megohm resistors R102 and R103. These resistors are connected to differential amplifier Z101 (pins 2 and 3).

The next two states of Z101 form an absolute value amplifier. The stage is set up such that regardless of the polarity of tip and ring, the difference voltage will always appear in a positive direction at pin 14 of Z101. The overall gain of the absolute value amplifier is 4.7. The output from pin 14 is fed to transistor Q104 through a voltage divider R112 and R113. The output of Q104 (marked RNG in FIG. 2B) is then coupled to the microcomputer input pin 19 of FIG. 1C. With the gain structure as described and the attenuation factor of R112 and R113, Q104 will be saturated for DC voltages greater than 25 volts at tip and ring. This provides an on-hook/off-hook indication to the microcomputer which is used for determination of dial tap.

Figure 2A:
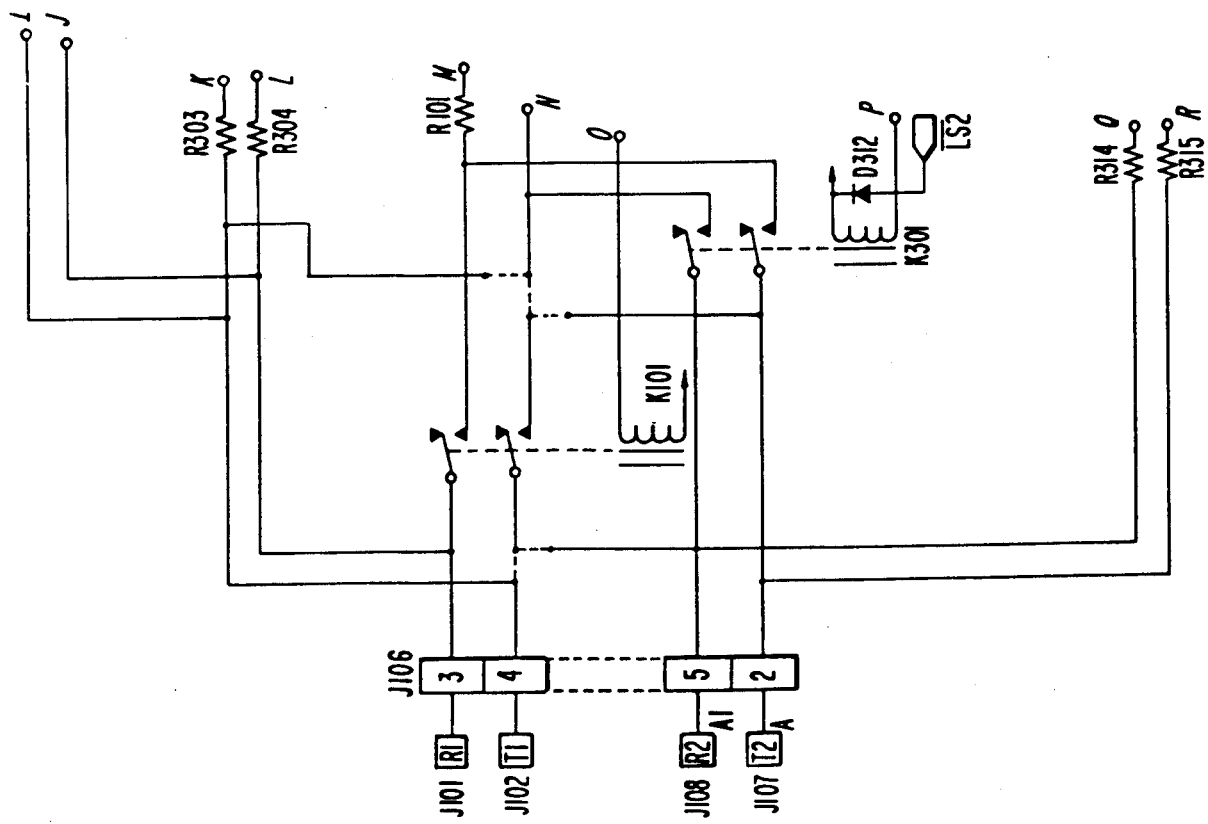
FIGS. 2A and 2B together constitute a circuit diagram of another portion of the telephone answering machine.
Figure 2B:
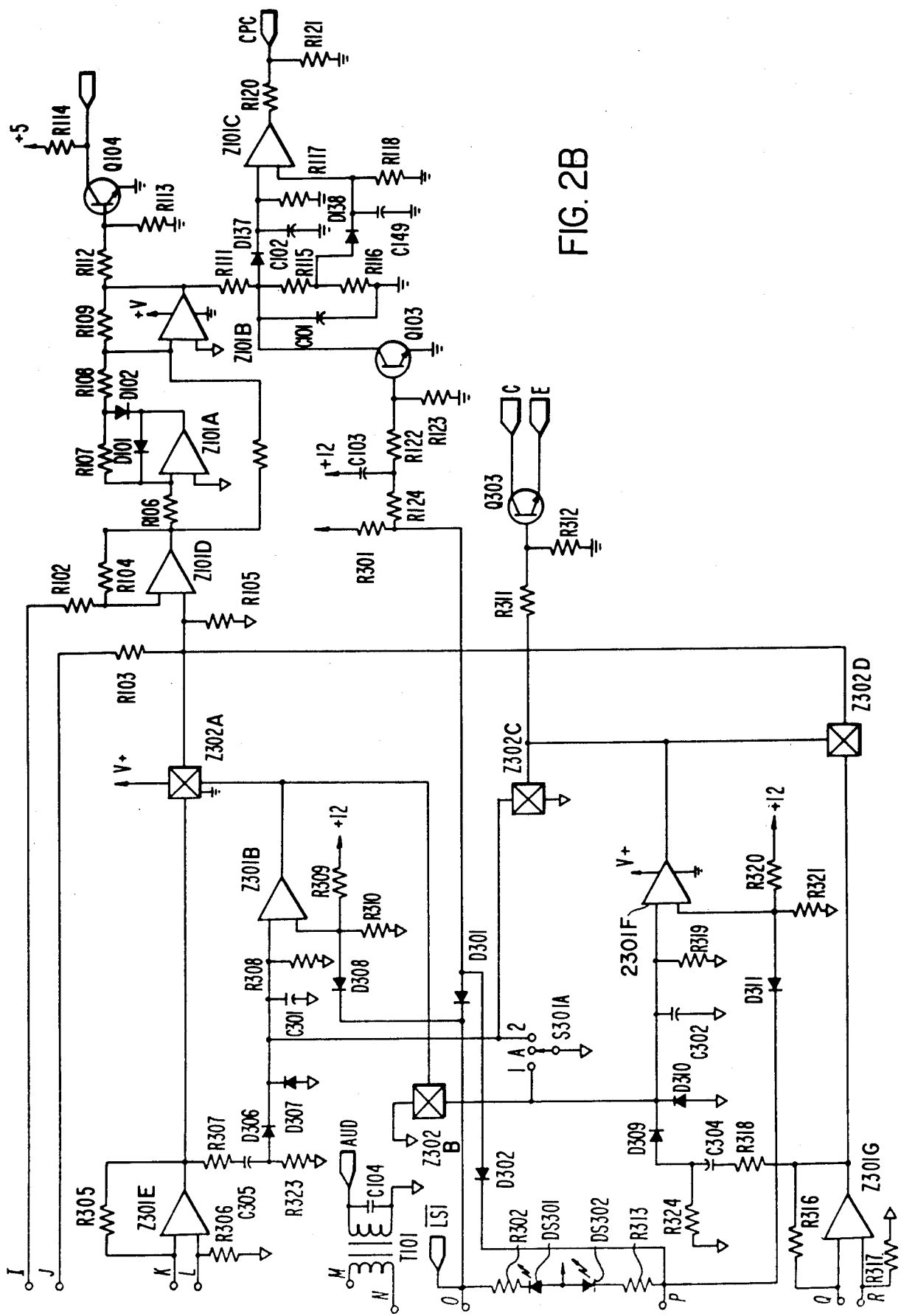

During ringing, transistor Q104 of FIG. 2B will be turned off and on. This toggling of the transistor will be noted by the microcomputer and upon its cessation, the logic level at RNG (pin 19) of FIG. 1C will be examined. If the logic level is low, the toggling will be considered a valid ring. If the pin is high, however, it will be assumed that toggling was caused by dial tap.

Upon the receipt of a valid ring signal, pin 37 of the microcomputer will go high to close the transmit circuitry of the telephone answering machine, so that the announcement recorded on the announcement tape may be transmitted to the calling party. At the end of the announcement interval, pin 37 will go low and pin 36 will go high, so that the telephone answering machine is set to receive the incoming message and cause the incoming message to be recorded on the incoming message tape T2. As mentioned above, the first incoming message to be so recorded causes the initial message and accompanying tone to be erased.

The invention provides, therefore, a telephone answering machine which contains an initial message from the manufacturer recorded on the incoming message tape, this message being erased when the machine is put into normal use.

It will be appreciated that while a particular embodiment of the invention has been shown and described, modifications may be made. It is intended in the claims to cover all modifications which come within the true spirit and scope of the invention.

We claim:

1. In a telephone answering machine which includes a magnetic tape mechanism for recording incoming messages received over a telephone line sequentially on a magnetic tape, said magnetic tape having a control signal and an initial message recorded thereon, and which also includes a microcomputer, and first circuit means connected to the microcomputer and to the magnetic tape mechanism for establishing a setting operation by setting the magnetic tape mechanism to an origin position when power is applied to the telephone answering machine, the combination of: second circuit means connected to said microcomputer and to said magnetic tape mechanism to cause said magnetic tape mechanism to move away from said origin position after the setting operation to enable the control signal recorded on the magnetic tape to be sensed; and third circuit means coupled to said magnetic tape mechanism and to said microcomputer and responsive to the control signal recorded on the magnetic tape to introduce said control signal to said microcomputer to indicate the presence of said initial message on said magnetic tape; and fourth circuit means connected to said microcomputer and to said magnetic tape mechanism to cause said magnetic tape mechanism to play back the initial message recorded on said magnetic tape upon the receipt of said control signal by said microcomputer.

2. The combination defined in claim 1, in which said microcomputer causes said second circuit means to return said magnetic tape to said origin position after said initial message has been played back, and said microcomputer then causes said telephone answering machine to enter an auto answer mode.

3. The combination defined in claim 2, in which said telephone answering machine responds to a telephone call received over the telephone line when in its auto answer mode to cause an incoming message to be recorded on said magnetic tape and to cause said initial message and control signal recorded on said magnetic tape to be erased.

4. The combination defined in claim 3, and which includes further circuit means connected to said microcomputer including a manually operated switch to cause said magnetic tape mechanism to play back the initial message each time the switch is operated prior to the receipt of a telephone call over the telephone line.

* * * * *